United States Patent
McGrath

(10) Patent No.: US 11,795,988 B2
(45) Date of Patent: Oct. 24, 2023

(54) MOUNTING DEVICE FOR A MOUNTING MEMBER

(71) Applicant: ADVANCED DESIGN MFG LLC, Antioch, CA (US)

(72) Inventor: Andrew Hascall McGrath, Lafayette, CA (US)

(73) Assignee: ADVANCED DESIGN MFG LLC, Antioch, CA (US)

(*) Notice: Subject to any disclaimer, the term of this patent is extended or adjusted under 35 U.S.C. 154(b) by 194 days.

(21) Appl. No.: 16/776,511

(22) Filed: Jan. 30, 2020

(65) Prior Publication Data
US 2021/0239149 A1 Aug. 5, 2021

(51) Int. Cl.
*F16B 9/02* (2006.01)
*F16B 37/08* (2006.01)
*F16B 5/02* (2006.01)

(52) U.S. Cl.
CPC ........ *F16B 37/0807* (2013.01); *F16B 5/0233* (2013.01); *F16B 9/02* (2013.01)

(58) Field of Classification Search
CPC .... F16B 9/00; F16B 9/02; F16B 9/023; F16B 9/026; F16B 35/005; F16B 37/047; F16B 37/064
USPC ................................ 403/192, 194, 195, 196
See application file for complete search history.

(56) References Cited

U.S. PATENT DOCUMENTS

| | | | | |
|---|---|---|---|---|
| 2,616,475 A * | 11/1952 | Koza | ...................... | F16B 39/04 411/298 |
| 2,630,339 A * | 3/1953 | Appleton | ................ | F16L 19/10 285/154.1 |
| 2,743,146 A * | 4/1956 | Wheeler | ................ | A45B 23/00 108/50.12 |
| 2,986,409 A * | 5/1961 | Weber | .................. | H02G 3/0683 285/154.3 |
| 3,275,347 A * | 9/1966 | Scott | ...................... | F16L 19/10 403/194 |
| 4,634,307 A * | 1/1987 | Gnaedinger | ........... | F16M 11/10 403/194 |
| 4,676,533 A * | 6/1987 | Gerondale | ............ | F16L 37/088 285/139.2 |
| 5,230,536 A * | 7/1993 | Rider | ........................ | F16L 5/06 285/136.1 |
| 5,340,258 A * | 8/1994 | Simon | .................... | F16B 35/005 411/339 |
| 5,971,444 A * | 10/1999 | Hawkins | .................. | F16L 5/06 285/139.2 |

(Continued)

*Primary Examiner* — Flemming Saether
(74) *Attorney, Agent, or Firm* — Quarles & Brady LLP

(57) ABSTRACT

A mounting device for a mounting member is disclosed. The mounting device comprises a first flange configured to be fitted under a mounting surface and a second flange configured to be inserted in the first flange. The second flange has a first section that is configured to provide a second flange orifice for inserting the mounting member, a second section having a plurality of threads for receiving the first flange, a third section having a plurality of threads, and a fourth section having a plurality of threads. A compression nut having an inner surface is configured to pass over the mounting member and tightened on the fourth section of the second flange over the plurality of threads. A ring is configured to be fitted over the mounting member and between the fourth section of the second flange and the compression nut.

18 Claims, 3 Drawing Sheets

(56) References Cited

U.S. PATENT DOCUMENTS

| | | | |
|---|---|---|---|
| 7,780,139 B2* | 8/2010 | Markert | E04H 12/2261 |
| | | | 248/523 |
| 8,196,872 B1* | 6/2012 | McGrath | F16B 9/052 |
| | | | 248/65 |
| 8,807,601 B2* | 8/2014 | Anderson | H02G 3/0675 |
| | | | 285/139.2 |
| 9,291,188 B2* | 3/2016 | English | F16B 13/0808 |
| 2009/0087280 A1* | 4/2009 | Harnetiaux | F16B 39/04 |
| | | | 411/436 |

\* cited by examiner

MOUNTING DEVICE FOR A MOUNTING MEMBER

FIELD OF THE DISCLOSURE

The present disclosure is generally related to mounting devices, and more particularly related to a combination flange type of a mounting device for a mounting member.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Monitors such as television monitors and computer monitors, have reduced in size through the recent years due to miniaturization of electronic components. All these types of monitors require substantial shelf or table top space when positioned for convenient viewing. Further, some large monitors merely sit on a floor and require valuable space in a room or an area. Typically, various mounting devices are used to mount monitors or other devices to free up valuable space in an area. The various mounting devices include low-profile wall mount brackets, tilting wall mount brackets, full-motion wall mount brackets, ceiling mount brackets, etc.

Apart from above mentioned monitors, mounting of tablets, card swipe machines, phones require a mounting device for height adjustment and flexible movement in all directions. In some cases, flanges are used for mounting various devices to save valuable space. Currently, there are various types of flanges available such as a welding neck flange, a slip on flange, a socket weld flange, a lap joint flange, a threaded flange, and a blind flange. In an example, a lap joint flange can be used for mounting pipes or bars on flat surfaces. However, the lap joint flange fails to provide attaching and affixing of mounting members like tubes, pipes, rods, or bars. Further, the currently available flanges fail to provide height or length adjustment of the mounting members like tubes, pipes, rods, or bars. Further, the currently available flanges provide no or very little support for height and angle modulations of the flanges.

Therefore, there is a need for an improved design of a mounting flange for mounting members, such as tubes, pipes, rods, or bars, on a mounting surface in order to overcome the above mentioned challenges.

SUMMARY OF THE INVENTION

According to embodiments illustrated herein, a mounting device for a mounting member is disclosed. The mounting device includes a first flange configured to be fitted under a mounting surface and having a first flange orifice, a first portion, and a second section portion. The mounting device further includes a second flange configured to be inserted in the first flange, through the mounting surface and the first flange orifice of the first flange. The second flange has a first section that is configured to provide a second flange orifice for inserting a tube, a second section having a plurality of threads for receiving the first flange, a third section having a plurality of threads, and a fourth section having a plurality of threads. The mounting device further includes a compression nut having an inner surface and is configured to pass over the mounting member and tightened on the fourth section of the second flange over the plurality of threads. A ring is configured to be fitted over the mounting member and between the fourth section of the second flange and the compression nut.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1A:
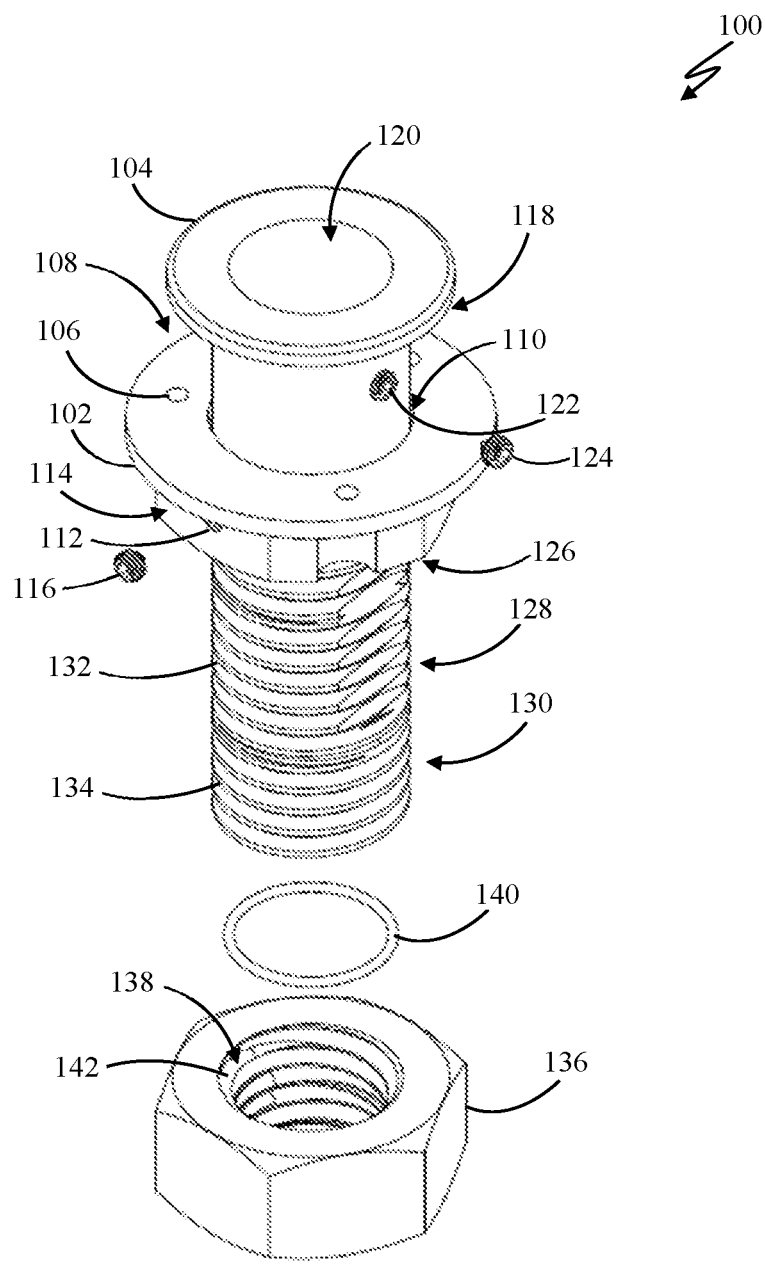
FIG. 1A is a perspective view of a mounting device in accordance with the present disclosure.
Figure 1B:
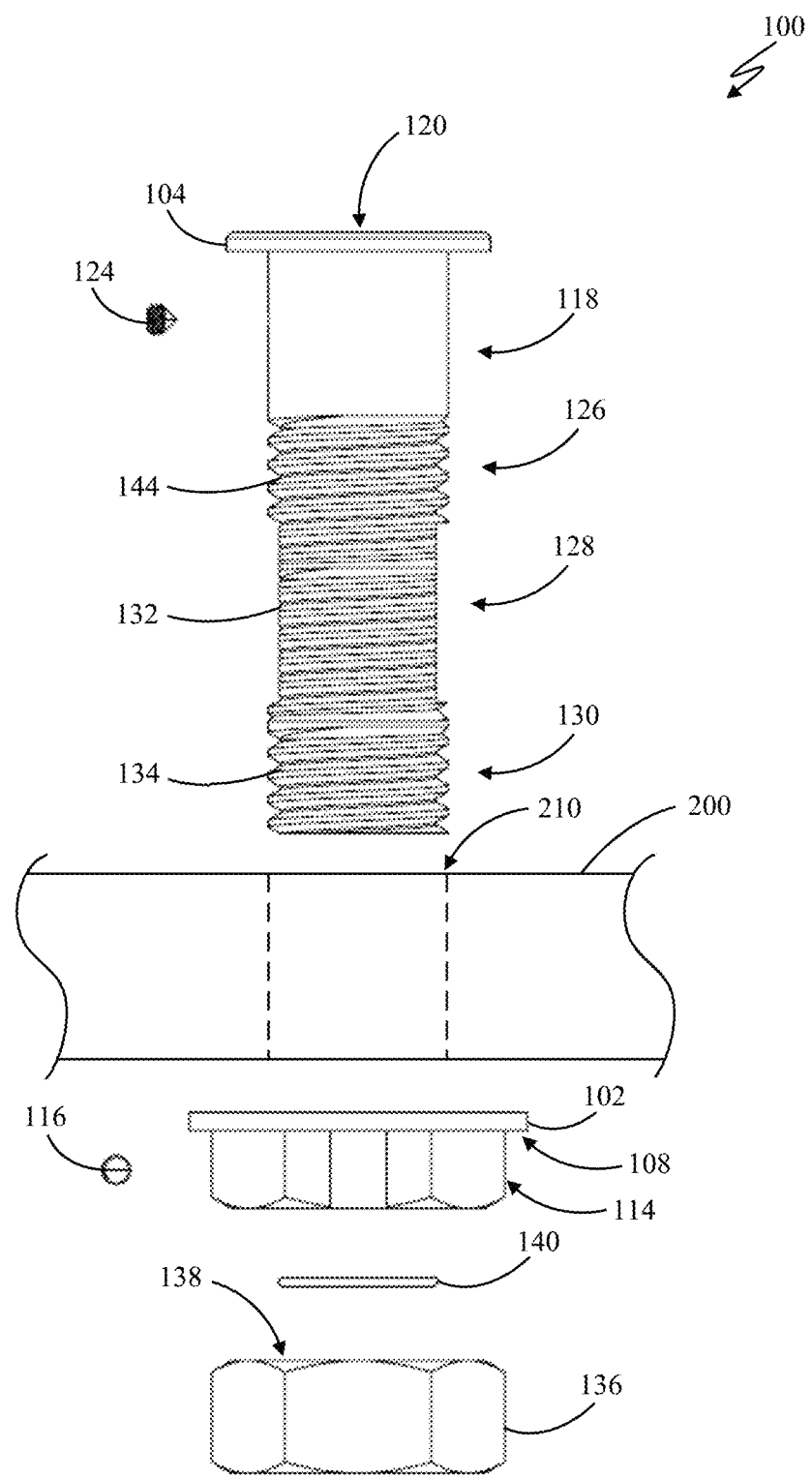
FIG. 1B is an exploded view of the mounting device of FIG. 1A.

FIGS. 1A and 1B illustrate a mounting device 100, according to an embodiment. The mounting device 100 may include a first flange 102 and a second flange 104. The first flange 102 may be configured to be fitted under a mounting surface 200 (see FIG. 1B). Further, the first flange 102 may have one or more holes 106 on a first portion 108 of the first flange 102. Additionally, a fastener (not shown) may be inserted in each of the one or more holes 106 for affixing the first flange 102 to the mounting surface 200. In one case, the fastener may be a screw and the one or more holes 106 may be one or more threaded holes. In another case, the fastener may be a nail. The nail may be hammered through the each of the one or more holes 106 into the mounting surface 200 for affixing the first flange 102 to the mounting surface 200.

Figure 2:
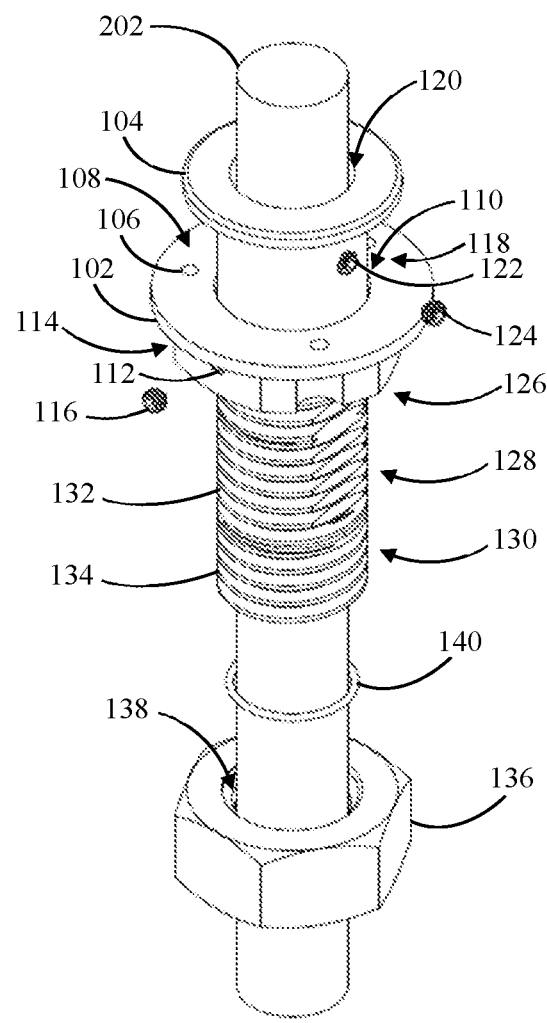
FIG. 2 is a perspective view of a mounting member received by the mounting device of FIG. 1A.

The first flange 102 may have a first flange orifice 110 for inserting the second flange 104. Additionally, the first flange 102 may have one or more holes 112 on a second portion 114 of the first flange 102. In an exemplary embodiment, the one or more holes 112 may be threaded holes and a fastener (for example, a set screw) 116 may be inserted in each of the one or more holes 112 to affix the second flange 104. In one case, the set screw 116 may be made of rigid material. In another case, the set screw 116 may be made of compressional plastic or nylon. In one embodiment, the second flange 104 may be inserted in the first flange 102, through a mounting hole 210 in the mounting surface 200 and the first flange orifice 110 of the first flange 102. Further, the second flange 104 has a first section 118 with a second flange orifice 120 for inserting a mounting member 202, as shown in FIG. 2. The mounting member 202 may be, but is not limited to, a tube, a pipe, a rod, or a bar. Further, the mounting member 202 may be made of metal, wood, or plastic.

The first section 118 of the second flange 104 may have one or more holes 122. The one or more holes 122 may be configured to receive a set screw 124 for affixing the mounting member 202 at a required height. The one or more holes 122 may be threaded holes. In an exemplary embodiment, the set screw 124 may be inserted in the one or more holes 122 to affix the mounting member 202 based on the required height of the mounting member 202. The set screw 124 may be made of a rigid material. In another case, the set screw 124 may be made of compressional plastic or nylon. Further, the second flange 104 may include a second section 126 having a plurality of threads 144 for receiving the first flange 102, a third section 128, and a fourth section 130. The third section 128 has a plurality of threads 132 which are flattened at sides to provide grip for a wrench or a spanner (not shown). Similarly, the fourth section 130 has a plurality of threads 134 to receive a compression nut 136.

In an embodiment, the compression nut 136 may be configured to pass over the mounting member 202 and may be tightened on the fourth section 130 of the second flange 104 over the plurality of threads 134, using a wrench or a spanner. In an exemplary embodiment, the compression nut 136 may have an inner surface 138. Further, a ring 140 may be configured to be fitted over the mounting member 202 and disposed between the fourth section 130 of the second flange 104 and the compression nut 136. In one case, the ring 140 may be a stretchable O-ring and made of materials such as silicon, plastic, or rubber. Additionally, the compression nut 136 may have a flat lip 142 on the inner surface 138. The flat lip 142 and the ring 140 may have equal diameters such that, when the compression nut 136 is tightened on the plurality of threads 134 of the fourth section 130 of the second flange 104, the ring 140 may be held over the flat lip 142 of the compression nut 136. It should be noted that, on tightening the compression nut 136, the ring 140 may cover a space defined between the mounting member 202 and the fourth section 130 of the second flange 104, and thereby securing the mounting member 202 from movement. In one embodiment, the mounting member 202 may have a diameter less than diameters of the ring 140 and the compression nut 136.

The mounting device 100 may be made of a material selected from the group of materials consisting of metal, an alloy, glass, plastic, or wood. For example, the first flange 102 and the second flange 104 may be made of a variety of materials including metal and non-metals. In one embodiment, the mounting device 100 may be designed to mount a ranging thickness of mounting members on a ranging thickness of mounting surfaces, without departing from the scope of the disclosure.

Various embodiments of a mounting device for a mounting member has been disclosed. The disclosed embodiments encompass numerous advantages. Such mounting devices may be fitted to the mounting surface of variable thickness. Such mounting devices have an ability to mount tubes of variable thickness. Further, such mounting devices improve speed and ease of use by allowing the mounting device to be assembled on-site. Further, such mounting devices may be designed as per the particular requirements at any time and location. Additionally, such mounting devices may be used to adjust the height of the mounted device as per the requirements of a user. Further, such mounting devices may be assembled by the user merely by making a mounting hole of size equivalent to a diameter of the first flange in a mounting surface (see, e.g., the mounting hole 210 in the mounting surface 200 of FIG. 1B), without any skilled knowledge. Therefore, such mounting devices, i.e., of a combination flange type, are optimal and easy to use.

The features of the present invention are apparent with reference to the foregoing description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

While the preferred embodiment of the present invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A mounting device for securing a mounting member to a mounting surface, the mounting device comprising:
   a first flange configured to be arranged along one side of the mounting surface, the first flange having a first portion, a second portion extending from the first portion, and a first flange orifice extending through the first and second portions of the first flange, the first portion of the first flange having one or more holes configured to receive a fastener to affix the first flange to the mounting surface;
   a second flange configured to be inserted through another side of the mounting surface opposite the first flange and received by the first flange orifice of the first flange, the second flange having a first section, a second section extending from the first section, a third section extending from the second section, a fourth section extending from the third section, and a second flange orifice extending through the first, second, third, and fourth sections that is configured to slidably receive the mounting member, the second, third, and fourth sections each having a plurality of threads configured to threadably engage the first flange orifice of the first flange;
a compression nut having an inner surface configured to slidably receive the mounting member and threadably engage the plurality of threads along at least a portion of the fourth section of the second flange; and
a ring configured to slidably receive the mounting member, the ring being disposed between the fourth section of the second flange and the compression nut when the compression nut threadably engages the plurality of threads along at least the portion of the fourth section of the second flange,
wherein the second portion of the first flange includes one or more holes configured to receive a set screw to secure the second flange within the first flange orifice of the first flange,
wherein the first section of the second flange includes at least one hole configured to receive a set screw to secure the mounting member within the second flange orifice at an adjustable height relative to the second flange orifice, and
wherein the second and fourth sections of the second flange have outer diameters that are equal.

2. The mounting device of claim 1, wherein the compression nut has a flat lip on the inner surface that is configured to engage the ring such that, when the compression nut threadably engages the plurality of threads along at least the portion of the fourth section of the second flange, the ring is secured within a gap between the mounting member and the second flange orifice of the second flange by the flat lip, thereby securing the mounting member from movement within the second flange orifice.

3. The mounting device of claim 2, wherein the ring and the flat lip of the compression nut have equal diameters.

4. The mounting device of claim 1, wherein the plurality of threads along the third section of the second flange are flattened along two opposing sides of the third section.

5. The mounting device of claim 1, wherein the ring is comprised of an elastic material.

6. The mounting device of claim 1, wherein an outer diameter of the first section of the second flange is equal to the outer diameters of the second and fourth sections of the second flange.

7. The mounting device of claim 6, wherein an outer diameter of the third section of the second flange is equal to the outer diameters of the first, second, and fourth sections of the second flange.

8. The mounting device of claim 1, wherein the at least one hole of the first portion of the first flange includes a plurality of holes that are configured to receive a plurality of fasteners to affix the first flange to the mounting surface.

9. The mounting device of claim 1, wherein the first portion of the first flange has an outer diameter that is greater than an outer diameter of the second section of the first flange.

10. The mounting device of claim 1, wherein the one or more holes of the first portion of the first flange is one or more threaded holes.

11. A mounting device for securing a mounting member to a mounting surface, the mounting device comprising:
a first flange configured to be affixed to one side of the mounting surface, the first flange having a first portion extending from a first end of the first flange, a second portion extending from the first portion to a second end of the first flange opposite the first end of the first flange, and a first flange orifice extending through the first and second ends of the first flange, the first portion of the first flange having one or more holes configured to receive a fastener to affix the first flange to the one side of the mounting surface;
a second flange having a first section extending from a first end of the second flange, a second section extending from the first section, a third section extending from the second section, a fourth section extending from the third section to a second end of the second flange opposite the first end of the second flange, and a second flange orifice extending through the first and second ends of the second flange that is configured to slidably receive the mounting member, the second end of the second flange being configured to be inserted through the mounting surface and received by the first flange orifice of the first flange, the second, third, and fourth sections of the second flange each having a plurality of threads configured to threadably engage the first flange orifice of the first flange; and
a compression nut configured to slidably receive the mounting member and threadably engage at least a portion of the fourth section of the second flange,
wherein an outer diameter of the first end of the first flange is greater than an outer diameter of the first end of the second flange, and
wherein the second portion of the first flange has one or more holes configured to receive a set screw to secure the second flange within the first flange orifice of the first flange.

12. The mounting device of claim 11, wherein the first section of the second flange includes a hole configured to receive a set screw to secure the mounting member within the second flange orifice at an adjustable height relative to the mounting surface.

13. The mounting device of claim 11, wherein the first flange is configured to be disposed entirely on the one side of the mounting surface.

14. The mounting device of claim 11, wherein the outer diameter of the first end of the first flange is greater than an outer diameter of the second end of the first flange.

15. The mounting device of claim 11 further comprising:
a ring configured to slidably receive the mounting member and to engage a flat lip of the compression nut such that, when the compression nut threadably engages the plurality of threads along at least the portion of the fourth section of the second flange, the ring is disposed between the second end of the second flange and the flat lip of the compression nut.

16. A mounting device for securing a mounting member to a mounting surface, the mounting device comprising:
a first flange having a first end, a second end opposite the first end of the first flange, and a first flange orifice extending through the first and second ends of the first flange, the first end of the first flange configured to be affixed to one side of the mounting surface;
a second flange having a first section extending from a first end of the second flange, a second section extending from the first section, a third section extending from the second section, a fourth section extending from the third section to a second end of the second flange opposite the first end of the second flange, and a second flange orifice extending through the first and second ends of the second flange that is configured to slidably receive the mounting member, the first end of the second flange being configured to engage another side of the mounting surface opposite the first end of the first flange, the second end of the second flange being configured to be inserted through the mounting surface and received by the first flange orifice of the first flange, at least the second section of the second flange having a plurality of threads configured to threadably engage the first flange orifice of the first flange; and a compression nut configured to slidably receive the mounting member and threadably engage a plurality of threads of the fourth section of the second flange, wherein the first flange includes one or more holes disposed between the first and second ends that is configured to receive a set screw to secure the second flange within the first flange orifice of the first flange, wherein the second and fourth sections of the second flange have outer diameters that are equal, wherein the third section of the second flange has a plurality of threads that are configured to engage the first flange orifice of the first flange, the plurality of threads of the third section of the second flange being flattened along two opposing sides of the third section of the second flange, and wherein the first end of the first flange includes one or more holes configured to receive a fastener to affix the first end of the first flange to the mounting surface.

17. The mounting device of claim 16, wherein the second flange is configured to secure the mounting member at an adjustable height relative to the first end of the second flange.

18. The mounting device of claim 17, wherein the first section of the second flange includes a hole configured to receive a set screw to secure the mounting member within the second flange orifice of the second flange at the adjustable height.

* * * * *